United States Patent Office 3,465,252
Patented Sept. 2, 1969

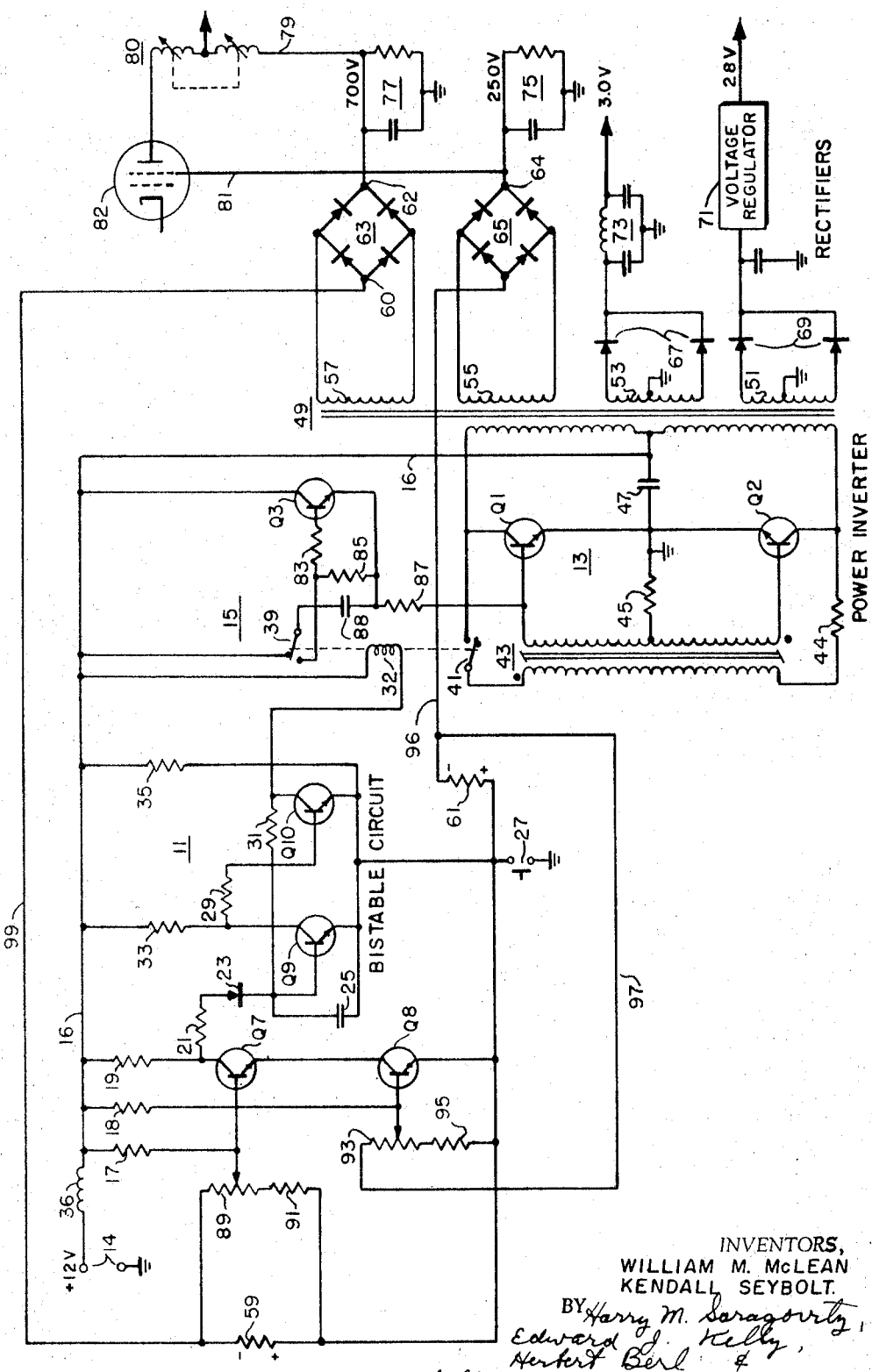

3,465,252
TRANSCEIVER POWER SUPPLY WITH OVERLOAD PROTECTIVE CIRCUITRY
William M. McLean, West Henrietta, and Kendall Seybolt, Mumford, N.Y., assignors to the United States of America as represented by the Secretary of the Army
Filed Sept. 20, 1966, Ser. No. 580,840
Int. Cl. H04b 1/40
U.S. Cl. 325—151                                   5 Claims

ABSTRACT OF THE DISCLOSURE

This DC to DC type power supply includes a transistorized inverter which is controlled by a flip-flop. In the event of an overload in either the plate or screen supply voltages of a tetrode, which voltages are provided by this power supply, the flip-flop changes state and switches off the inverter. The flip-flop also controls the starting of the inverter.

---

The present invention relates to a power supply with protection against destructive overloads and more particularly to a power supply for the transmitter of a transceiver. The power supply is of the DC-DC converter type in which a low DC voltage, for example 12 volts, is converted to an alternating current by means of a transistorized power inverter, stepped up or down to desired voltages by means of a transformer, then rectified and filtered to provide operating voltages for the transmitter. The transceiver push-to-talk switch is arranged to switch on the power supply by setting a bistable circuit to a first stable state. The bistable circuit includes a relay which is thereby energized and which in turn energizes and starts the power inverter. The power supply provides plate and screen supply voltages for the tetrode type final power amplifier of the transmitter and the circuitry includes means to sense both plate and screen currents drawn by the tetrode. These sensed currents are utilized to trigger or flip the bistable circuit to the opposite second stable state in the event that either of the sensed currents exceeds predetermined limits, thereby de-energizing the relay and stopping the inverter. With this arrangement the power supply can be protected against a wide variety of overload, short circuit or open circuit conditions.

It is therefore an object of this invention to provide a novel and useful power supply with overload protection circuitry.

A further object of this invention is to provide a power supply circuit which conserves battery power and is therefore adaptable for mobile communications use.

Another object of the invention is to provide a power supply which is automatically de-energized if any of a number of overload, short circuit or open circuit conditions in its load should occur.

These and other objects and advantages of the present invention will become apparent from the following detailed description and drawing, the sole figure of which is a circiut diagram of one embodiment of the present invention.

In the drawing, the power supply shown provides DC voltage of 700 volts and 250 volts for energizing the plate and screen circuits respectively of the final power amplifier of the transmitter which comprises a tetrode 82. Also provided are a 3.0 DC tube filament supply and 28 volt DC for the transistorized transmitter driven circuits (not shown). The 12 volt DC power source applied to terminals 14 provides operating power for the illustrated power supply. The bistable or flip-flop circuit 11 comprises transistors Q9 and Q10 and the associated circuitry. The collector of Q9 is connected to the 12 volt lead 16 via resistor 33. The collectors and bases of Q9 and Q10 are cross coupled by means of resistors 29 and 31. The collector of Q10 is connected to the lead 16 via the coil 32 of push-talk relay 15, which includes contacts 39 and 41, shown in the de-energized position. The emitters of Q9 and Q10 are tied together and to one terminal of the open push-to-talk switch 27, the other terminal of which is grounded. The power inverter 13 comprises transistors Q1 and Q2 and transformers 43 and 49. By virtue of the feedback provided from the collectors of Q1 and Q2 to the base-emitter circuits thereof via transformer 43, oscillations will be set up which will convert the DC power applied to the inverter from lead 16 to alternating current power. This AC power appears in the four secondary windings 51, 53, 55, and 57 of transformer 49. The full wave diode bridge rectifier 63 is connected to the winding 57. The positive output voltage of this bridge at terminal 62 is filtered by shunt resistor-capacitor filter 77 and applied to the plate of tetrode 82 via the antenna coupler 80 as the B+ supply thereof. Connected via line 99 between the negative terminal 60 of bridge 63 and the ungrounded end of switch 27 is a plate-current-sensing means comprising resistor 59. When switch 27 is closed, a negative voltage with respect to ground will be developed across 59 proportional to the current drawn by the tetrode plate. The screen supply voltage of 250 volts is provided by bridge rectifier 65 and filter 75. A screen grid-current-sensing resistor 61 is connected via line 96 from the negative terminal of bridge 65 to the ungrounded end of switch 27 and when this switch is closed a voltage of the polarity shown, with a magnitude proportional to the screen grid current, will appear across resistor 61. The 3.0 volt filament supply comprises the center-tapped winding 53 and the two diode rectifiers 67 and filter 73. The driver supply comprises winding 51, diode rectifiers 69 and voltage regulator 71, which maintains a constant output of 28 volts DC.

The transistors Q7 and Q8 have their collector-emitter circuits connected in series, with the emitter of Q8 connected to the ungrounded end of switch 27 and the collector of Q7 connected to the 12 volt lead 16 via resistor 19. The collector of Q7 is coupled to the base of Q9 via resistor 21 and diode 23. Resistors 17 and 18 connect the bases of Q7 and Q8 respectively to 12 volt line 16. The adjustable voltage divider 89 and resistor 91 are connected across resistor 59 and the adjustable voltage divider 93 and resistor 95 across the resistor 61.

The operation of the power supply is as follows: When the receiver portion of the transceiver is operating, the push-to-talk switch 27 will be open, as shown, thereby disabling the power supply. Since switch 27 is in the ground return path of both transistors Q9 and Q10, neither of these transistors can conduct while 27 is open and the relay coil 32 will therefore be de-energized. The open relay contacts 41 disable the power inverter 13. The relay contacts 39, in the position shown, will charge capacitor 88 to the voltage of line 16. When it is desired to transmit, switch 27 is closed. The capacitor 25 connected from the base to emitter of Q9 prevents rapid conduction of Q9 and therefore Q10 will conduct first and Q9 will be held nonconducting, energizing relay coil 32, thereby causing bistable circuit 11 to assume a first stable state. Contacts 39 and 41 will then assume the opposite or energized position in which the feedback path of inverter 13 will be completed through the closed contacts 41 and the voltage on capacitor 88 will be applied through contacts 39 to the base of transistor Q3. The resulting emitter current of Q3 is applied to the base of inverter transistor Q1 via resistor 87 to provide a starting pulse for the inverter, after which the inverter action is self-sustaining. This energizes all of the rectifier circuits and provides operating potential for all of the transmitter stages. Manual release of the push-to-talk switch will shut the power supply down and disable the transmitter. During normal operation, both transistors Q7 and Q8 are arranged to be conducting and thus the collector of Q7 will be substantially at ground potential. In order for Q7 and Q8 to conduct the bases thereof must be positive with respect to ground. The base of Q7 will assume a potential somewhere between the positive voltage of lead 16 and the negative voltage at the top or ungrounded end of resistor 59, depending on the adjustment of voltage divider 89, the resistance thereof and the value of resistor 17. The movable contact of the voltage divider 89 is therefore adjusted to such a position that at the normal plate current of tetrode 88 the base voltage of Q7 will be somewhat positive, resulting in conduction of Q7. In a similar manner, voltage divider 93 is adjusted so that the base of Q8 is somewhat positive at normal screen grid curent of the tetrode. In the event that a short circuit or other overload causes either the plate or screen currents of the power amplifier 82 to rise above predetermined safe limits, the negative voltage across the sensing resistors 59 and 61 will rise, causing the base voltage of the associated transistor Q7 or Q8 to decrease. When the base voltage of either transistor reaches zero or becomes negative, the conduction of both Q7 and Q8 will cease and the collector of Q7 will rise toward the positive voltage of lead 16. This applies a positive pulse of voltage to the base of transistor Q9 via resistor 21 and diode 23, thus rendering Q9 conductive and flipping the bistable circuit 11 to its opposite or second stable state with Q10 and its associated relay 15 non-conducting or de-energized. This opens contacts 41 and stops the operation of the inverter 13. After the power supply has been shut down in this manner it can be turned on again by momentarily releasing and re-closing the push-to-talk switch 27, and will thereafter function normally, assuming that the overload condition has been cleared. The capacitor 25, in addition to its function mentioned above, prevents very brief overloads from triggering the bistable circuit 11.

By passing the ground leads of the transistor Q8 and resistors 59, 61, 91 and 95 through switch 27, leakage from the 12 volt power source to ground through these elements is eliminated when the power supply is off. There will be a small amount of leakage from the 12 volt line 16, of the order of microamperes, through inverter transistors Q1 and Q2, and also from line 16 through resistor 17, voltage divider 89, line 99, the two upper diodes of bridge 63 and the resistor of filter 77 to ground, however the illustrated connection of the push-to-talk switch 27 is preferred to placing it in series with the 12 volt terminal since this would mean that the switch would be required to handle the substantial supply current of the inverter 13.

The disclosed circuit gives protection for virtually any abnormal condition of operation of the tetrode power amplifier 82. For example, if the plate of tetrode 82 or the 700 volt lead 79 shorts to ground, the increased current though resistor 59 will cause triggering of circuit 11; if the tetrode looses its plate voltage, the screen will act as a plate and the screen current will soar, causing transistor Q8 to be cut off and thus triggering flip-flop 11. Also, if the screen becomes shorted the same result obtains. If the tetrode 82 looses its grid bias the resultant increase in plate current will also trigger the protective circuit, as explained above.

While the invention has been illustrated in connection with an illustrative embodiment, the inventive concepts disclosed herein are of general application, hence the invention should be limited only by the scope of the appended claims.

What is claimed is:

1. A transceiver comprising a power supply for the transmitter portion thereof, said power supply comprising a source of direct current power, a power inverter for converting said power to alternating current form, said power inverter including a transformer with a plurality of secondary windings providing a different alternating current voltages, means connected to each of said windings to rectify and filter said alternating current voltages thereby providing a plurality of direct current voltages, said transmitter comprising a final power amplifier including plate and screen electrodes, means to connect one of said direct current voltages to said screen electrode and another to said plate electrode, means to sense the current drawn by said plate and screen electrodes, a push-to-talk switch and a bistable circuit comprising a pair of transistors, said switch in the closed position applying said direct current power to said bistable circuit, said bistable circuit comprising a relay connected to one of said pair of transistors and arranged to be energized when said bistable circuit is in its first stable state, and means to set said bistable circuit to said first stable state upon the closure of said push-to-talk switch, said relay including contacts adapted to energize and start said power inverter when said relay is energized, and means responsive to the sensed currents drawn by said plate or screen electrodes to trigger said bistable circiut to its second stable state if either one of said sensed currents exceeds a safe predetermined value.

2. The apparatus of claim 1 wherein said last-named means comprises a pair of serially connected transistors adjusted to be conducting under normal conditions of said power supply and being arranged to be cut off if either of said sensed currents exceeds said predetermined value, and means responsive to the cut off of either of said serially connected transistors to trigger said bistable circuit to its second stable state.

3. A power supply for the transmitter portion of a transceiver comprising, means including a power inverter to convert a direct current voltage supply to alternating current, said power inverter including a transformer with a plurality of windings providing different alternating current voltages, means to rectify and filter each of said alternating current voltages, thereby providing direct current operating power for a plurality of loads in said transmitter, a bistable circuit including means to energize and start said power inverter when in a first stable state and to deenergize said power inverter when in a second stable state, a switch adapted when closed to apply operating power to and to set said bistable circuit to said first stable state, and means to sense the direct current drawn by each of said loads and means responsive to said sensed currents in excess of a predetermined limit to trigger said bistable circuit to said second stable state.

4. The apparatus of claim 3 wherein said transmitter comprises a final power amplifier tube including screen grid and plate electrodes and where each of said electrodes comprises one of said plurality of loads.

5. The apparatus of claim 3 wherein said bistable circuit comprises a pair of transistors connected as a flip-flop and said means to energize and start said power inverter comprising a relay connected to one of said pair of transistors, said relay comprising a pair of contacts, one of which is adapted to inject a pulse of starting current to said power inverter and the other completes the feedback paths of said power inverter when said relay is energized.

References Cited

UNITED STATES PATENTS

| | | | |
|---|---|---|---|
| 2,845,529 | 7/1958 | Weldon | 325—151 |
| 2,914,614 | 11/1959 | Crooks | 325—21 |
| 2,935,605 | 5/1960 | Mathiev | 325—21 |
| 3,059,184 | 10/1962 | Germain | 325—21 |
| 3,262,015 | 7/1966 | McNamee | 328—8 |
| 3,337,818 | 8/1967 | Wahlgren | 325—186 |

ROBERT L. GRIFFIN, Primary Examiner

ALBERT J. MAYER, Assistant Examiner

U.S. Cl. X.R.

325—21, 186; 328—8